(12) United States Patent
Fidan et al.

(10) Patent No.: US 10,214,838 B2
(45) Date of Patent: Feb. 26, 2019

(54) HIGH MODULUS SINGLE TWISTED NYLON 6.6 YARNS

(71) Applicant: KORDSA TEKNIK TEKSTIL ANONIM SIRKETI, Izmit (TR)

(72) Inventors: M. Sadettin Fidan, Izmit (TR); Yücel Ayyildiz, Izmit (TR); Basak Kanya, Izmit (TR)

(*) Notice: Subject to any disclaimer, the term of this patent is extended or adjusted under 35 U.S.C. 154(b) by 0 days.

(21) Appl. No.: 15/740,002

(22) PCT Filed: Jun. 9, 2016

(86) PCT No.: PCT/TR2016/050175
§ 371 (c)(1),
(2) Date: Dec. 27, 2017

(87) PCT Pub. No.: WO2017/213600
PCT Pub. Date: Dec. 14, 2017

(65) Prior Publication Data
US 2018/0187345 A1    Jul. 5, 2018

(51) Int. Cl.
*D02G 3/48* (2006.01)
*B60C 9/00* (2006.01)
*D01F 6/60* (2006.01)

(52) U.S. Cl.
CPC ............ *D02G 3/48* (2013.01); *B60C 9/0042* (2013.01); *D01F 6/60* (2013.01)

(58) Field of Classification Search
CPC . D02G 3/02; D02G 3/48; D02G 1/205; B60C 9/0042
See application file for complete search history.

(56) References Cited

U.S. PATENT DOCUMENTS

| | | | |
|---|---|---|---|
| 3,343,363 A | 9/1967 | Stow, Jr. et al. | |
| 3,496,985 A * | 2/1970 | Werner | B60C 9/0042 152/451 |
| 3,610,311 A * | 10/1971 | Simons | B29D 30/40 152/451 |
| 3,672,423 A * | 6/1972 | Duduk | B60C 9/0042 152/556 |
| 3,849,976 A | 11/1974 | Kenyon | |
| 3,921,691 A * | 11/1975 | Kenyon | B60C 9/0042 152/458 |
| 4,284,117 A | 8/1981 | Poque et al. | |
| 4,623,011 A | 11/1986 | Kanuma | |
| 5,240,667 A | 8/1993 | Andrews, Jr. et al. | |
| 2016/0339746 A1* | 11/2016 | Sato | D01F 6/80 |

FOREIGN PATENT DOCUMENTS

JP    3180524 B2    6/2001
JP    2001279525 A    10/2001

OTHER PUBLICATIONS

Ayse Aytac et al:"Effect of Twist Level on Tyre Cord Performance", Fibers and Polymers, Korean Fiber Society, Seoul, KR, vol. 10, No. 2, Apr. 1, 2009 (Apr. 1, 2009),pp. 221-225,XP002755961,ISSN:1229-9197, DOI:10.1007/S12221-009-0221-7 [retrieved on May 6, 2009] Experimental; figures 3,4; tables 1-3.

* cited by examiner

*Primary Examiner* — Shaun R Hurley
(74) *Attorney, Agent, or Firm* — Gokalp Bayramoglu

(57) ABSTRACT

The present invention discloses high modulus single twisted nylon 6.6 yarns having a tensile stress value between 2.0 and 2.8 cN/dtex at 4% elongation. The single twisted yarns are prepared from a raw polyamide 6.6 yarn. The single twisted yarns are used as reinforcement in shaped rubber composites. The minimum heat shrinkage of the cords is 4% and maximum heat shrinkage is 7%.

7 Claims, No Drawings

HIGH MODULUS SINGLE TWISTED NYLON 6.6 YARNS

CROSS REFERENCE TO RELATED APPLICATIONS

This application is the national phase entry of International Application No. PCT/TR2016/050175, filed on Jun. 9, 2016, the entire content of which is incorporated herein by reference.

TECHNICAL FIELD

The present invention relates to a high modulus nylon 6.6 twisted yarns as reinforcement in pneumatic tires and mechanical rubber goods.

BACKGROUND OF THE INVENTION

It is well known that nylon 6.6 yarns have bi-elastic tensile properties, which means low initial modulus and higher final modulus. The low initial modulus makes the tire lifting/expansion process possible without any distortions in green tire, and high final modulus (modulus after transition point from low to high modulus) improves high speed tire durability as cap ply in pneumatic radial tires (PCR and LT).

In U.S. Pat. No. 3,343,363 single twisted nylon 6.6 strands/yarns and cords having initial modulus of between 25 and 60 g/d and tenacity higher than 7.0 g/d at room temperature have been disclosed as tire reinforcements. The initial modulus values are determined according to ASTM A1380-61T.

In U.S. Pat. No. 3,849,976 high modulus nylon 6.6 single-ply, two-ply and three-ply cords having L5 Modulus higher than 60 g/d obtained by applying high stretch at high temperature during hot stretching process have been disclosed as tire reinforcement.

In U.S. Pat. No. 4,284,117 single twisted nylon, polyester, rayon and aramid yarns are disclosed as cap ply reinforcements in pneumatic radial tires.

In order to obtain the high modulus single twisted yarns, the existing regular nylon 6.6 yarns having regular modulus (tensile stress level less than 1.25 cN/dtex at 4% elongation, or tensile modulus level at 4% elongation less than 31.25 cN/dtex or 35.4 g/d) have been used. Those single twisted yarns prepared from the regular modulus yarns had very high stiffness and lower bending fatigue resistance due to excessive stretching at high temperatures.

SUMMARY OF THE INVENTION

The objective of the present invention is to produce single twisted strands having high modulus as reinforcement in pneumatic tires and mechanical rubber goods.

As can be seen in patent literature, initial modulus or LASE (Load At Specified Elongation) values of nylon yarns and cords can be increased by applying high stretches at high temperatures. In order to obtain stable (non-reversible) properties, which are maintained to a large extent even after in relaxed state (conditioned with free cut ends under lab conditions), it was necessary to expose the nylon 6.6 yarns or cords to a temperature higher than 250° C. Under those conditions (high stretching under high temperature), yarns and cords become more rigid, and they lose partially their bending and compression fatigue resistance.

According to invention, nylon 6.6 yarns are stretched higher than 5% and less than 12% at a temperature range of 230-250° C. and wound up on bobbins or spools with a winding tension between 150 g and 500 g per yarn (strand). The same conditions are also valid for single twisted yarn fabrics as roll.

DETAILED DESCRIPTION OF THE INVENTION

According to invention, in order to produce the high modulus single twisted yarns, the high modulus raw nylon 6.6 yarns are used instead of regular modulus raw nylon 6.6 yarns which resulted in improved fatigue resistance.

The tensile stress value at 4% of the said raw nylon 6.6 yarns is greater than 1.30 cN/dtex, preferably between 1.35 and 1.60 cN/dtex (determined with tensile tester according to ASTM D885-16)

The high stretched yarns having high modulus maintain their properties in bobbins, because they are not permitted to relax, and they are used in tire without experiencing significant relaxation (modulus drop).

The high modulus yarns (strands) in high stretched fabrics also maintain their properties in rolls, because they are not permitted to relax, and they are used in tire without experiencing significant relaxation (modulus drop).

The tensile properties of the high modulus nylon 6.6 twisted yarns are determined after 24 hours conditioning on spool (without unwinding) under winding tension at 24° C. and with 55% relative humidity (ASTM D885-16). After conditioning, the twisted yarns are tested within 1 minutes after unwinding from the spool.

In case of fabrics, the test tabbies are conditioned as tabby (without separating and cutting out the yarns from tabby as fabric) under the same conditions as mentioned above. After conditioning, the yarns cut out from the tabbies are tested within 1 minutes.

Such single twisted yarns have a stress at 4% elongation of 2.0 cN/dtex (51 g/dtex and 56.7 g/d modulus) to 2.8 cN/dtex (71.4 g/dtex and 79.3 g/d modulus) and a thermal shrinkage at 177° C. of 4.0% to 7.0%.

The stress at 4% elongation is determined according to the following formula: Stress at 4% elongation(cN/dtex)=Tension at 4% elongation(cN)/linear density (dtex)

The nominal dtex of the yarn is taken as linear density (e.g. 1400 for 1400×1 construction).

The modulus values are calculated by multiplying the stress values at 4% elongation with 25 in order to find the needed stress value for 100% elongation.

The thermal shrinkage of yarns and cords are determined with a TESTRITE heat shrinkage tester under a pretension of 0.045 g/dtex at 177° C. with 2 minutes exposure time.

According to invention, the heat shrinkage of the cords are within the limits of 4% and 7%, preferably 5.0% and 6.5%.

According to invention, the total nominal dtex of the cords can change between 300 and 4000 dtex.

According to invention, in order to have optimum restraining force and bending fatigue resistance, the twist factors of the yarns are adjusted within 30 and 50, preferably 35 and 45 according to the following formula;

Twist factor=$(t/m \times \sqrt{tex/1000})$

The high modulus nylon 6.6 twisted yarns (strands) can be used as reinforcement in pneumatic tires and mechanical rubber goods.

Definitions

Dtex: The gram weight of yarn having 10,000 meter length.

Denier: The gram weight of yarn having 9,000 meter length g/d: Gram/denier g/dtex: gramm/dtex Linear density: Weight per unit length as g/dtex or g/d (denier)

Modulus at 4% elongation: (Stress at 4% elongation) ×25 as g/d or g/dtex

L5 Modulus: Modulus at 5% elongation, (stress at 5% elongation) ×20 as g/d or g/dtex Tenacity: Breaking force/total linear density (g/dtex)

Twist: Twist per meter (t/m or tpm)

What is claimed is:

1. A dipped and heat-set polyamide 6.6 single twisted yarn, comprising a raw polyamide 6.6 yarn having a tensile stress value of greater than 1.30 cN/dtex at 4% elongation;
   wherein a tensile stress value of the single twisted yarn at 4% elongation is greater than 2.0 cN/dtex and less than 2.8 cN/dtex,
   wherein a heat shrinkage of the single twisted yarn is greater than 4.0% and less than 7.0% determined at 177° C. under 0.045 g/dtex pretension with 2 minutes exposure time;
   wherein the tensile stress values are determined with a tensile tester according to ASTM D885-16;
   wherein the single twisted yarn is twisted strand.

2. The single twisted yarn of claim 1, wherein the stress value at 4% elongation of the raw polyamide 6.6 yarn is greater than 1.35 cN/dtex and less than 1.50 cN/dtex.

3. The single twisted yarn of claim 1, wherein the heat shrinkage is 5.0 to 6.5%.

4. The single twisted yarn of claim 1, wherein a dtex of the single twisted yarn is greater than or equal to 300 dtex and less than or equal to 4000 dtex.

5. The single twisted yarn of claim 1, wherein a twist factor of the single twisted yarn is greater than or equal to 30 and less than or equal to 50, wherein the twist factor is calculated according to the following formula:

$$\text{twist factor} = (t/m \times \text{SQRT}(\text{tex}/1000)).$$

6. The single twisted yarn of claim 1, wherein the stress value at 4% elongation of the raw polyamide 6.6 yarn is between 1.35 cN/dtex and 1.60 cN/dtex.

7. The single twisted yarn of claim 5, wherein the twist factor of the single twisted yarn is between 35 and 45;
   wherein the twist factor is calculated according to the following formula:

$$\text{twist factor} = (t/m \times \text{SQRT}(\text{tex}/1000)).$$

* * * * *